(No Model.)  2 Sheets—Sheet 1.

E. C. OSGOOD.
MECHANISM FOR TRANSMITTING MOTION WITH VARIABLE SPEED.

No. 568,367. Patented Sept. 29, 1896.

WITNESSES
A. N. Ponney.
C. G. Graydon.

INVENTOR
Edward C. Osgood,
By his Atty.
Henry Williams (No Model.) 2 Sheets—Sheet 2.

E. C. OSGOOD.
MECHANISM FOR TRANSMITTING MOTION WITH VARIABLE SPEED.

No. 568,367. Patented Sept. 29, 1896.

UNITED STATES PATENT OFFICE.

EDWARD C. OSGOOD, OF WALTHAM, MASSACHUSETTS.

MECHANISM FOR TRANSMITTING MOTION WITH VARIABLE SPEED.

SPECIFICATION forming part of Letters Patent No. 568,367, dated September 29, 1896.

Application filed April 20, 1896. Serial No. 588,231. (No model.)

*To all whom it may concern:*

Be it known that I, EDWARD C. OSGOOD, a citizen of the United States, residing at Waltham, in the county of Middlesex and State of Massachusetts, have invented a new and Improved Mechanism for Transmitting Motion with Variable Speed, of which the following is a specification.

This mechanism is for transmitting motion by means of friction at different speeds, and it comprises a shaft which drives a disk wheel, two disk wheels arranged on opposite sides of the disk wheel first named and driving another shaft, friction mechanisms on opposite sides of the single disk wheel and intermediate therewith and the pair of disk wheels, whereby motion is communicated by the former to the latter, and mechanism for moving the friction mechanism toward and from the center of the faces of the wheels, whereby the speed imparted is varied at will.

By means of the invention a great range and variety of speed are possible, and an exceedingly exact adjustment, with slight friction and great economy.

The nature of the invention in detail is fully described below, and illustrated in the accompanying drawings, in which—

Figure 1:
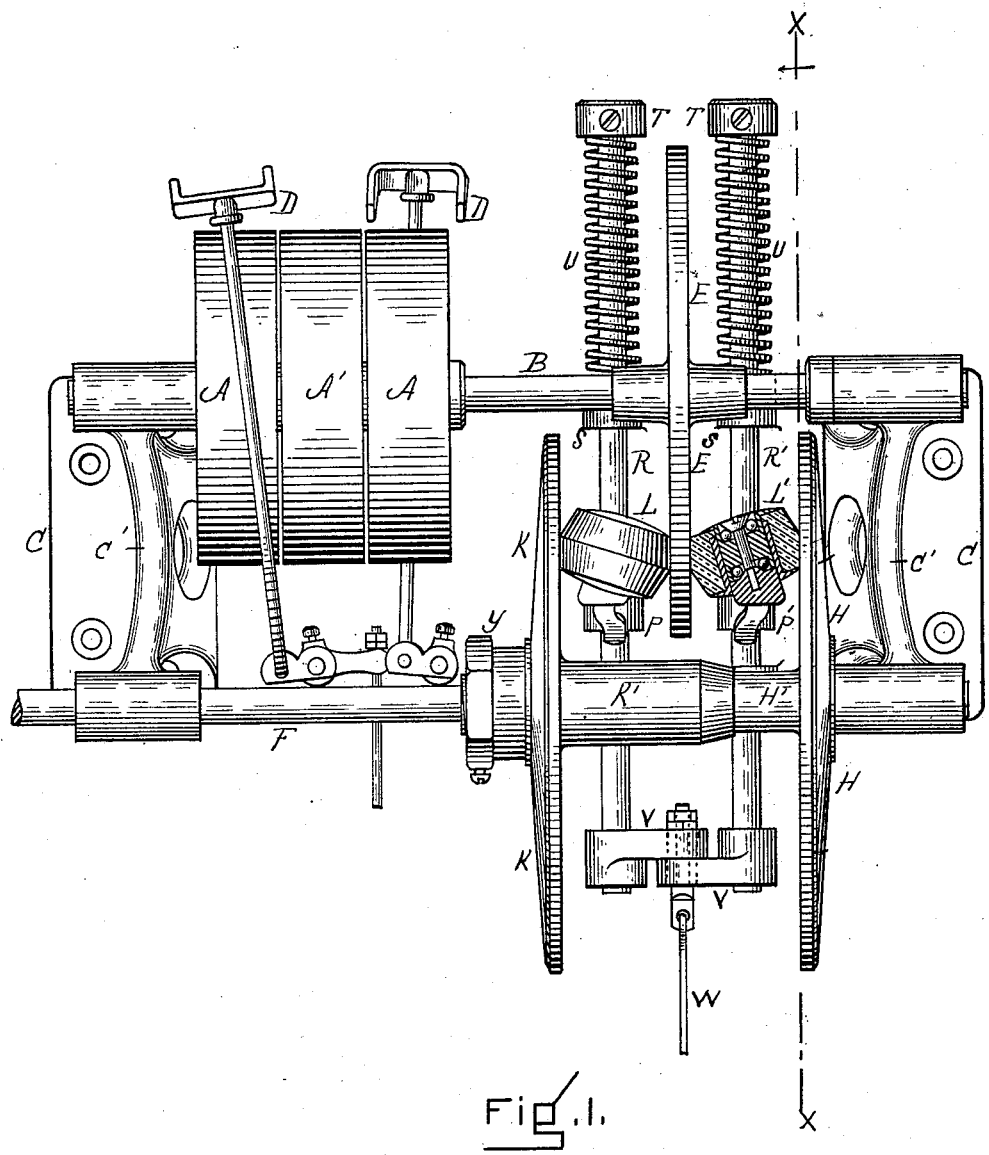
Figure 2:
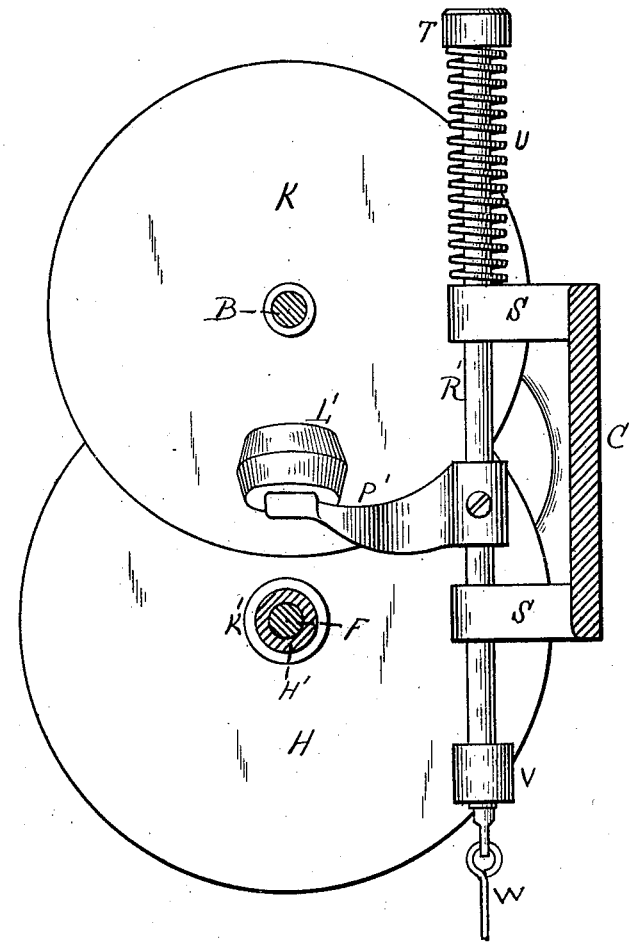
Figure 3:
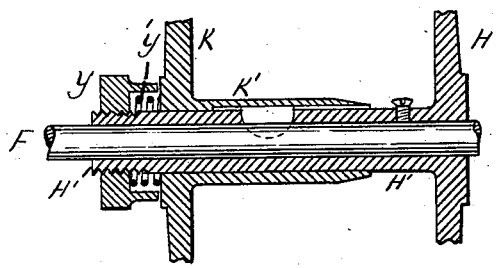

Figure 1 is an elevation of a mechanism embodying my invention, one of the friction-wheels being shown in section. Fig. 2 is a section on line $x$, Fig. 1. Fig. 3 is a horizontal section taken through the hubs of the pair of disks.

Similar letters of reference indicate corresponding parts.

A A represent loose pulleys, and A' a fast pulley, on the shaft B, having bearings in arms C', extending from a suitable frame or support C.

D D are ordinary belt-shipping devices supported by the frame.

Fast on the shaft B is the disk wheel E. Below the shaft B is a parallel shaft F, supported by the arms C'. Fast on this shaft F is the disk wheel H, set at the right of the wheel E. The wheels E and H are of such diameters as to overlap each other, as shown. The hub H' of the wheel H extends for quite a distance to the left, (in the drawings,) and a disk wheel K, similar to the wheel H, has its hub K' splined on the hub H', so that it can be moved toward and from the wheel H, but will rotate therewith. This wheel K is set on the opposite side of the wheel E from the wheel H. Small friction-wheels L L' are supported, preferably by ball-bearings, by arms P P', which are adjustably made fast to vertical rods R R', extending through vertical holes in brackets S S', supported by the frame, said brackets being so located as to bring the friction-wheels on opposite sides of the disk wheel E and in contact with its faces and the adjacent faces of the disk wheels H K.

The rods are provided with heads or collars T, between which and the bracket springs U are disposed around the rods, and the lower ends of the rods are connected by arms V, to which is secured an ordinary treadle connection W.

In the drawings the rods R R' are represented as having been pulled down by the treadles against the power of the springs, so as to bring the friction-wheels L L' lower between the faces of the disk wheel E and the inner faces of the disk wheels H and K. In this position it is evident that if motion is imparted to the shaft B the disk wheel E will impart motion to the friction-wheels L L', and through them to the disk wheels H K, which will rotate the shaft F. The farther down toward the periphery of the disk wheel E the friction-wheels L L' are drawn by the treadle the longer is their path on the disk wheel E and the greater is the number of their revolutions with each revolution of said wheel E and the nearer are said friction-wheels to the center of the wheels H K, thus increasing the speed of this pair of wheels. If the friction-wheels L L' should be raised, their contact with the disk wheel E would be nearer its center and their contact with the disk wheels H K would be nearer their peripheries, thus causing the speed of the shaft F to be less. It is apparent that by drawing down the rods L or allowing them to be lifted a great variety and range of speed may be attained, and the speed may be regulated with great exactness.

In order that there may be a yielding pressure by the disk wheels H K upon the wheels L L', a hollow nut Y is screwed upon the hub H' and a spring Y' surrounds said hub within the chamber in the nut and bears against the disk wheel K. By means of this spring the pressure of the two wheels H and K upon the wheels L L' is equalized.

It will be noticed that the friction-rolls L L' are tipped or inclined so that they do not rotate on a horizontal plane; moreover, that their peripheries are not flat, but are angle-shaped, that is to say, beveled down from the center of the periphery to the opposite edges thereof. Thus the upper bevel of each roll is in contact with the driving-disk E, while the lower bevels are in contact with the disks H and K. This prevents the twisting friction which is found when the intermediate rolls or wheels have plain peripheries and are horizontally placed. Of course the opposite faces of the wheel E and the inner faces of the wheels H and K should be flat and parallel.

Having thus fully described my invention, what I claim, and desire to secure by Letters Patent, is—

1. A mechanism for transmitting motion with variable speed, comprising a disk wheel mounted upon a shaft; a pair of disk wheels mounted upon a shaft and arranged on opposite sides of the first-named disk wheel and overlapping the same; friction-rolls supported intermediate of the outer faces of the single disk wheel and the inner faces of the two flanking disk wheels, and in contact with all said faces, said friction-rolls being provided with beveled peripheries, and tipped so that the planes of their rotation are at an angle other than a right angle with the planes of rotation of the pair of disk wheels; and mechanism for moving the friction-rolls toward and from the centers of the faces of the pair of disk wheels, substantially as set forth.

2. A mechanism for transmitting motion with variable speed, comprising a disk wheel mounted upon a shaft; a pair of disk wheels mounted upon a shaft and arranged on opposite sides of the first-named disk wheel and overlapping the same; friction-rolls supported intermediate of the outer faces of the single disk wheel and the inner faces of the two flanking disk wheels, and in contact with all said faces; mechanism for moving the friction-rolls toward and from the centers of the faces of the pair of wheels; a nut on the hub of one of the pair of disk wheels; and a spring between said nut and the other of said pair, substantially as described.

EDWARD C. OSGOOD.

Witnesses:
HENRY W. WILLIAMS,
A. N. BONNEY.